United States Patent [19]

Sawhill

[11] 4,267,197

[45] May 12, 1981

[54] ANIMAL FEED SUPPLEMENT AS A THIXOTROPIC STABLE SUSPENSION

[75] Inventor: James W. Sawhill, Canoga Park, Calif.

[73] Assignee: Pacific Kenyon Corporation, Long Beach, Calif.

[21] Appl. No.: 93,903

[22] Filed: Nov. 13, 1979

Related U.S. Application Data

[63] Continuation of Ser. No. 917,472, Jun. 21, 1978, abandoned.

[51] Int. Cl.$^3$ ................................................ A23K 1/22
[52] U.S. Cl. ........................................ 426/69; 426/74; 426/573; 426/648; 426/658; 426/807
[58] Field of Search ................. 426/2, 69, 573, 630, 426/635, 658, 807, 74, 648

[56] References Cited

U.S. PATENT DOCUMENTS

| | | | |
|---|---|---|---|
| 3,656,931 | 4/1972 | Dancy | 426/69 X |
| 3,733,203 | 5/1973 | Steen | 426/69 |
| 3,794,740 | 2/1974 | Achorn et al. | 426/807 X |
| 3,873,728 | 3/1975 | Moore | 426/69 X |
| 3,901,976 | 8/1975 | Roth et al. | 426/807 X |
| 3,940,494 | 2/1976 | Wilson et al. | 426/69 |
| 3,962,484 | 6/1976 | Grosso et al. | 426/807 X |
| 4,027,043 | 5/1977 | Schroeder et al. | 426/69 |
| 4,055,667 | 10/1977 | Linton et al. | 426/807 X |
| 4,062,988 | 12/1977 | De Santis | 426/807 X |

Primary Examiner—Robert A. Yoncoskie
Attorney, Agent, or Firm—Robert E. Strauss

[57] ABSTRACT

There is disclosed a stable thixotropic suspension of water insoluble animal feed nutrients in an aqueous sugar solution. The method comprises incorporating an ammonium phosphate, sulfate or mixture in an aqueous sugar solution in a sufficient quantity to form a gel, controlling the pH of the gel to a value from about 6.5 to about 7.5 and adjusting the water content of the mixture to provide a viscosity to the product from about 4,000 to about 10,000 centipoises. The resultant gel is an excellent carrier for the suspension of water insoluble nutrients such as, calcium carbonate, calcium sulfate, or insoluble drugs such as monisan. The gel provides a very stable suspension of the water insoluble nutrients, providing shelf life stability in excess of 12 weeks over a wide range of temperature. High temperature stability of the suspension can be further enhanced by including in the supplement a dispersing agent such as gellatinized starch, an alkali metal alginate or a montmorillonite or kaolin clay.

11 Claims, No Drawings

ANIMAL FEED SUPPLEMENT AS A THIXOTROPIC STABLE SUSPENSION

This is a continuation, of application Ser. No. 917,472, filed June 21, 1978, now abandoned.

BACKGROUND OF THE INVENTION

1. Field of Invention

This invention relates to animal feed supplements and, in particular, to animal feed supplements in suspension form containing a substantial quantity of water insoluble powdered nutrients.

2. Brief Statement of the Prior Art

The value of sugar-containing supplements as an energy source in animal diet has been recognized for many years. Phosphates have been added to the supplements as a source of dietary phosphorous; urea has been added to supply non-proteinous nitrogen; and fats have been included as described in U.S. Pat. No. 2,793,952 as a source of energy. Vitamins have been included in these supplements as described in U.S. Pat. No. 2,807,546.

There is currently no entirely satisfactory method of incorporating a substantial quantity of water insoluble nutrients in the liquid supplements while preserving the desirable liquid properties of the supplement. Examples of suitable water insoluble additives are calcium sources such as calcium carbonate, or calcium sulfate. Another product which has not been incorporated in liquid feed supplements successfully is monisan, a water insoluble drug additive.

Techniques presently practiced for suspending solids in liquid feeds comprises the use of clays such as attapulgite or bentonite clays. The clays must be used in large quantities, typically about 20 weight percent based on the weight of the supplement. Since the clays are inert, the user incurs a substantial cost for transportation and storage of an ingredient having no nutrient value.

BRIEF STATEMENT OF THE INVENTION

This invention comprises a method for the preparation of a stable, thixotropic suspension of a sugar containing solution which is ideally suited for use as an animal feed supplement and which can be used as a carrier for powdered, water insoluble feed ingredients such as calcium carbonate, calcium sulfate, and cottonseed meal, bone meal, etc., as well as water insoluble drugs such as monensin. The liquid phase of the suspension can be the aqueous sugar solution which can contain other water soluble nutrients or can also be a liquid-liquid emulsion wherein the water phase contains an animal edible fat in an oil-in-water emulsion.

The thixotropic liquid is prepared by incorporating an ammonium orthophosphate or sulfate in the aqueous sugar solution in a sufficient quantity to form a gel, controlling the pH of the gel to a value from about 6 to about 7.5, and adjusting the water content of the mixture to provide a viscosity thereto from about 4,000 to about 10,000 centipoises. This gel can be used as a carrier for the aforementioned water insoluble animal feed nutrients by adding the insoluble feed nutrient, in powdered form, to the gel. Surprisingly, it has been found that the addition of appreciable quantities of the powdered solid nutrient, e.g., from 5 to about 25 weight percent, based on the supplement, does not appreciably affect the viscosity or the thixotropic characteristic of the gel. The resulting suspension is stable for prolonged periods of storage and is stable over an extended temperature range. The high temperature stability of the gel can be enhanced by the incorporation of a minor quantity, typically less than 1 weight percent of a dispersing agent such as a gellatinized starch, an alkali metal alginate or a montmorillonite or kaolin clay.

DESCRIPTION OF THE PREFERRED EMBODIMENTS

The method of this invention comprises an improved manufacture of liquid animal feed supplements using an ammonium phosphate of sulfate salt as a gelling agent for an aqueous sugar solution and controling the pH and water content of the gel to achieve stability of the resultant product. The resulting gel is used as a carrier for powdered water insoluble, animal nutrients.

The following Table sets forth the proportions of the ingredients which are used in the method of the invention:

TABLE 1

| Component | Broad | Preferred |
|---|---|---|
| 1. Sugar solution | 12–90 | 22–75 |
| 2. Ammonium salt gelling agent | 1–7 | 2–5 |
| 3. Powdered Insoluble nutrient | 2–20 | 5–15 |
| 4. Solid dispersing agent | 0–2 | 0.2–1.5 |
| 5. Protein or equivalent protein | 0–40 | 20–40 |
| 6. Fat source | 0–25 | 3–15 |
| 7. Fat emulsifier | 0.05–1.0 | — |
| 8. Minerals, vitamins | 0–3 | 0.1–2 |
| 9. Preservatives | 0–8.0 | 0.1–2 |

Sugar Solution

The feed supplement prepared by the method of this invention comprises an aqueous sugar solution as its liquid phase. The sugar solution can be employed in the feed supplement at a concentration of from 12 to about 90, preferably from about 22 to about 75 weight percent, based on the weight of the sugar solution. The sugar ingredient can be any commercially available sugar such as sucrose, glucose, lactose, maltose or fructose. The source of sucrose is the cane and beet sugar industry; of glucose, the corn starch industry; and of lactose, the dairy industry. Maltose is available in malt syrup and fructose is available as a by-product of the dextran industry or from invert sugar. Preferably, aqueous solutions containing from 10 to about 90 weight percent, preferably from 12 to about 60 weight percent, sugars, are used. This concentration range includes most commercially available sugar-containing by-products of various industries.

The sugar industry produces large quantities of molasses which can be used directly. Molasses is commercially available as an aqueous solution having a sugar content from about 60 to 85 Brix, and a consistency varying from a thin to a thick syrup. The molasses can be any sugar-containing molasses such as cane or blackstrap molasses, beet molasses, converted molasses, wood sugar molasses, hydrosyrup, citrus molasses and the like. Molasses of a concentration of from 65 to about 85 Brix is preferred. By-products of the molasses and sugar industry can also be used such as Steffens filtrate, a sugar containing by-product obtained from beet molasses. Another sugar industry by-product in Myces, which is the residue after separation of yeast cells grown in a molasses culture medium.

Another by-product useful herein as a sugar ingredient is starch molasses which is a by-product of dextrose manufacture from corn or grain sorghums by acid or enzymatic hydrolysis. It contains greater than about 40 weight reducing sugar and greater than about 50 weight percent total sugar, (sugars calculated as dextrose).

Another sugar source is the dairy industry which produces large quantities of whey as a by-product of cheese manufacture. The whey is a dilute solution of the lactoalbumin, lactose, some of the fat, and the soluble inorganics from the parent milk. This solution is condensed and then spray dried or condensed to 40 or 50% solids and preserved. The spray dried solid is a powder which can be readily dissolved in water to form an aqueous sugar solution for use in the invention.

A typical analysis is as follows:

TABLE 2

| Composition of a Typical Spray Dried Whey | |
|---|---|
| Protein | 12.0% |
| Fat | 0.7% |
| Lactose | 60.0% |
| Phosphorous | 0.79% |
| Calcium | 0.87% |
| Ash | 9.7% |

Modified wheys such as partially delactosed whey in which some of the lactose in the whey is selectively removed can also be used. Another modified whey is partially hydrolyzed whey in which some of the lactose is hydrolyzed (usually by lactate enzymatic hydrolysis) thereby reducing the lactose content. A reduction in the lactose content of the whey is desirable to permit use of higher solids content wheys than can be used with the unmodified whey. The typical spray dried or condensed whey is limited to a solids content of from 40 to about 60 weight percent since lactose crystalizes at ambient temperatures from wheys of higher content lactose. The aforementioned modified wheys are free of this crystallization tendency and their solids content can be from 40 to about 80 weight percent without encountering any instability. Other milk products which can be included as a sugar source include dry skimmed milk which is the residue obtained by drying of defatted milk, and condensed skim milk residue, obtained by evaporating defatted milk.

A third source of sugar is the pulp and paper industry which produces large quantities of by-product wood sugars such as lignin sulfonates from wood during the sulfite pulping process. After the separation of lignin, the acidity of the resultant solution is neutralized with an ammonium or alkali metal bisulfite or base to form the following organic salts:
  ammonium lignin sulfonate;
  sodium lignin sulfonate; and
  magnesium lignin sulfonate.

A typical analysis of a commercially available ammonium lignin sulfonate solution is as follows:

TABLE 3

| Typical Analysis of Ammonium Lignin Sulfonate | |
|---|---|
| Percent Solids | 50.0% |
| Specific gravity | 1.237 |
| pH, 10% solution | 3.5 |
| Wood Sugars (expressed as glucose) | 16.0% |
| Tannin content | 3.0 |
| Available ammonia | 3.0% |
| Sulfur | 6.0% |
| Ash | 1.0% |

The manufacture of pressed wood yields another sugar-containing by-product which is hemicellulose extract, a concentrated soluble material obtained from treatment of wood at elevated temperature and pressure. This by-product has a total carbohydrate content greater than about 55 weight percent and contains pentose and hexose sugars. This by-product can be used as a sugar ingredient in the method of this invention.

The corn industry yields a number of by-products which contain sugars, typically glucose, and proteins. Examples of these are corn glutin feed, hydrolyzed corn protein and condensed fermented corn extractives. These also can be used as a sugar and/or protein ingredient herein.

The Ammonium Salt Gelling Agent

The ammonium salt which is added to the aforementioned sugar solution to effect gelling thereof can be any ammonium salt of orthophosphoric or sulfuric acid. Examples of suitable salts are monoammonium orthophosphate, diammonium orthophosphate, monoammonium sulphate and ammonium sulphate. Since the pH of the gelled product is substantially neutral, the ammonium salt gelling agent which is employed is preferably of mono ammonium and di-ammonium orthophosphates in approximately equal molar proportions. A suitable example of a commercially available product for this purpose is the ammonium phosphate solution available under the designation "9-30-0" which comprises a solution of mixed ammonium orthophosphates and polyphosphates containing 9% nitrogen in the form of ammonium and 30 weight percent phosphorous, calculated as $P_2O_5$ present in the phosphate. This solution is commonly obtained by the ammonia neutralization of superphosphoric acid, a mixture of principally orthophosphoric acid with approximately 20 weight percent of the phosphorous present as pyro and tripolyphosphoric acids. The ammonium sulphate is most commonly available as a solid dry product in the form of prills and can be added to the sugar solution as a dry solid or can be dissolved in water prior to addition.

Powdered Insoluble Nutrient

The powdered water insoluble nutrient can be any animal feed nutrient which is substantially insoluble. Examples of desirable additives that can be suspended in the gelled sugar solution prepared by the invention comprise calcium carbonate, calcium sulphate, or calcium phosphate. All of the aforementioned comprise inorganic nutrients and sources of elements needed for a balanced diet such as calcium, magnesium or phosphorous.

Other water insoluble nutrients in powder form that can be added include those which can serve as a nitrogen source for the animal's protein requirements such as: dried blood or meat meal from rendering plants which also serve as a phosphorous source, cottonseed meal, soymeal, dehydrated alfalfa, dried and sterilized animal and poultry manure, fishmeal, powdered egg, dried fish solubles, cell cream, and rabbit pellets. The fish solubles is a dried concentrate of the cooking water from a fish cannery which has a very high protein content. Cell cream is obtained by drying dead bacterial cells used to manufacture monosodium glutamate by fermentation. The dry powder usually contains about 90 weight percent protein. Rabbit pellets is a commercially available dry, composited mixture of ground, dehydrated alfalfa and a cereal such as corn or wheat with trace minerals and vitamins.

Protein Equivalent Ingredients

When the feed supplement is intended for consumption by ruminants, a non-protein nitrogen compound such as ammonical compounds, e.g., urea, buiret or mono or di-ammonium phosphate can be used to supply the protein nitrogen dietary requirements of the animals. The preferred material for nitrogen source is urea which can be added in an amount from 2 to about 15 weight percent, preferably from about 5 to about 12 weight percent, based on the feed supplement. Since the ammonium salt gelling agent contributes non-protein nitrogen, the quantity of the ingredient added solely as a source of non-protein nitrogen is lessened in proportion to the quantity of the ammonium salt gelling agent.

Generally, the feed supplement should not contain more than about 40 weight percent equivalent protein content from a protein or non-protein nitrogen compound and the aforeindicated upper limit for the concentration of urea in the supplement corresponds to this maximum equivalent protein content. When molasses is used as a sugar source, the maximum amount of urea can be reduced by the amount of nitrogen contributed by the molasses (about 1 to 3 weight percent) to the preferred, maximum 12 weight percent limit based on the feed supplement. A typical ruminant feed would, therefore, contain from 5 to about 15, preferably from 7 to about 12 weight percent urea as a source of non-protein nitrogen.

The Fat Ingredient

The gel can be formed from the aforementioned aqueous sugar solution or can be formed from an emulsion of a fat in the sugar solution. When the latter is employed, a source of an animal edible fat such as the edible, water insoluble fats and oils from animal and vegetable sources can be used in preparation of the supplement. The supplement prepared by the method of the invention can contain up to about 25 weight percent, based on the supplement weight, of the edible fat. Preferably, the composition has from 3 to about 15 weight percent of the fat. These fats are various fatty acids such as stearic, palmitic, oleic, linoleic, lauric, etc., and the mono, di or tri-glycerides of these fatty acids. Useful fats and oils can also include complex lipids such as the phospholipids, e.g., fatty acid esters of glycerol phosphate or lecithins, which also contain nitrogen bases such as choline. The fats are commonly identified by source and suitable fats which can be employed include the oils, tailings or residues of the following: soybean oil, cottonseed oil, sesame oil, olive oil, corn oil, tallow, fish oil, coconut oil, palm oil, etc. Preferably, relatively inexpensive sources of fats are employed such as the yellow grease compositions which are reclaimed restaurant fats and greases, acidulated soap stocks or acidulated fats and oils. The fat ingredient can also contain an antioxidant in an effective amount to inhibit oxidative degradation of the fat. e.g., from 0.01 to about 1 weight percent butylated hydroxyanisole, butylated hydroxytoluene, 4-hydromethyl-2, 6-3di-tert-butylphenol, etc.

The Fat Emulsifier

The composition can also contain a fat emulsifying agent and for this purpose any suitable cationic anionic or nonionic surfuctant can be employed. Examples of cationic surfuctants include fatty amines, fatty amides, quaternary alkyl and aryl ammonium salts and hydrates, etc. Suitable anionic surfuctants include the fatty acid gyceride sulfonates and fatty acid sulfonates such as sulfonated cottonseed oil, sulfonated sperm oil, sulfonated tallow, sulfonated aromatic hydrocarbons, e.g., benzene sulfonic acid, etc. Useful nonionic compounds include polyethylene oxide condensates of hydrophobic groups having a reactive hydrogen with from 10 to about 25 carbons condensed with from 2 to about 15 molecular weights of ethylene oxide. Examples of such materials include polyoxyethylene condensate with alkyl or alkenyl amines or maides, fatty acid partial esters of hexitans, etc. Free fatty acids and phospholipids which are present in some fat sources also function as emulsifying agents and no added emulsifying agent may be required with such fat sources.

The amount of the emulsifying agent employed for stabilizing the composition and preventing the separation of the fat ingredients during the manufacture of the product can be from about 0.05 to about 1 weight percent.

Solid Dispersing Agent

The solid dispersant which is used to impart high temperature stability to the gel and the suspension of the powdered insoluble solid nutrient in the gel can be a gellatinized starch, an alkali metal alginate, or a clay. These materials are used in minor proportions, up to about 2 weight percent and preferably from about 0.2 to about 1.5 weight based on the weight of the supplement compostion.

The starch employed can be a purified or raw starch. While pure starch is commonly a mixture of form 22–26 weight percent amylose and 74–78 weight percent amylopectin, the starch component can be any starch-containing material, including raw starch sources such as ground cereal products, e.g., flour, farina or meal of cereals such as corn, wheat, oats, barley, rice, sorghum, as well as flour of tubers such as potatoes, cassava and arrowroot or sago palm pith. Preferably, the starch component is a commercially available starch product which is refined from the aforementioned raw starch sources by milling, aqueous extraction and frying. The starch component is, most preferably pregelatinized by partial hydrolysis to increase its water solubility by heating an aqueous suspension of the starch component to form a gel or paste and drying of the product.

The raw starch component, refined starch or hydrolyzates therefrom, such as pregelatinized starch, can be used as the stabilizing agent in the preparation of the feed supplement of this invention. When a raw starch or nonhydrolyzed starch component is used, it may be necessary to prolong the heating of the aqueous mixture during preparation of the supplement, or, if desired, by separately heating an aqueous suspension of the starch component to effect gelatinization of the starch.

Other suitable solid dispersants include the ammonium and alkali metal alginates, e.g., ammonium, sodium, potassium alginates which are commercially available materials and useful as suspending agents for food additives. Clays such as montmorillonites or kaolins can also be employed in powdered form as solid dispersants. The kaolin clays include attapulgite while the montmorillonites include bentonite, two of the most common forms of clays which are commercially available under various trade designations from various suppliers.

The Method

The method of the invention comprises incorporating the ammonium salt gelling agent in the aqueous sugar solution in a sufficient quantity to effect the gelling of this solution. The ammonium salt can be added to the sugar solution or the reactants such as ammonia and phosphoric acid or sulfuric acid can be added to the sugar solution and permitted to react therein. Since the ammonium salts are also animal nutrients, supplying a source of nutrient nitrogen, phosphorous and/or sulphur, these additives serve a dual function of gelling the sugar solution and supplyng the dietary requirements of these elements. Accordingly, the salts may be added in excess of the minimal required to effect gellation of the sugar solution. Generally, however, the ammonium salt is added in the aforeindicated quantity with the occasional exception that greater quantities are added if necessary for the proper nutritional balance of the supplement.

The ammonium salt is preferably added to the aqueous sugar solution as an aqueous solution of from 20 to about 60 weight percent. Preferably, the salt is added as a highly concentrated solution to avoid the introduction of unnecessary quantities of water to the supplement. The various other ingredients are also added to the supplement simultaneously or sequentially with the addition of the ammonium salt gelling agent. The preferred technique is to add the various other ingredients to the sugar solution prior to the addition of the ammonium salt gelling agent since the latter quickly causes the formation of a gel which greatly limits the efficiency of mixing of the other ingredients. The other ingredients are preferably added as concentrated aqueous solutions, e.g., urea when employed is added as an aqueous solution of 23 weight percent nitrogen. When necessary, however, the urea can be added in solid, prill form to compensate for the presence of excessive amounts of water in the aqueous sugar solution or added thereto in the form of aqueous solutions of the other additives. The high temperature stabilizing agent is also incorporated in the mixture prior to the addition of the ammonium salt gelling agent and is dispersed therein by suitable agitation, e.g., use of a propeller mixer, centrifugal pump for recirculating the liquid contents of the mixing tank, etc.

After the other ingredients have been admixed with the sugar solution or emulsion of fat in the sugar solution, the aforementioned ammonium salt is added to effect gellation of the product.

The viscosity of the gel which is formed is dependent somewhat on the pH of the final product. The viscosity is at a maximum value at about 6.0 pH and decreases thereafter with increasing pH value. The pH of the mixture is preferably adjusted to neutral or near neutral, i.e., from 6.5 to about 7.5 and most preferably about 7 to avoid acidic conditions that would decompose some of the additives. Thus, when calcium carbonate is added as a solid nutrient, the pH of the supplement should be maintained above about 6 to avoid decomposition of the calcium carbonate and liberation of carbon dioxide. Similarly, when the animal drug monisan is added, the pH should be maintained at least about 6 to avoid any decomposition of this animal drug. Alkaline pH values are avoided because of the decreased viscosity of the gel at pH values significantly above neutral and because of the tendency of the ammonium salts and urea to decompose and liberate ammonia at alkaline pH values. Accordingly, the maximum pH value employed in the supplement is about 7.5.

The pH value can be adjusted by the addition, when necessary, of various bases such as ammonia, aqua ammonia, potassium hydroxide, etc. Of these, ammonia is the preferred base for neutralization of any excess acidity as required to maintain the desirable neutral of near neutral pH values. In some instances, it may become necessary to add an acid to the supplement to avoid excessively alkaline pH values. Suitable acids that can be used for this purpose are orthophosphoric acid, sulphuric acid, acetic acid, citric acid, hydrochloric acid, etc. Of these, the animal nutrient acids such as phosphoric acid and sulphuric acid are preferred.

The viscosity of the gelled product is appreciably affected by the quantity of water which is present in the supplement. This depends, to some extent, on the composition of the supplement and can be suitably controlled by the addition of water in the necessary quantities to maintain of the product between about 4,000 and 10,000 centipoises, as determined on a standard Brookfield viscosometer using a spindle speed of 4 rpm.

The water insoluble solid animal feed nutrient is added to the gel in powdered form. Preferably, the solid is of a size range passing a 20 mesh U.S. standard screen and, most preferably, of a size range passing a 100 mesh standard U.S. screen. The solid can be powdered to any further degree of fineness and the limit on the minimum particle size is controlled only by the economics and cost of finally subdividing the solid material. Typically, a size range processing a 100, amd retained on a 325 U.S. standard screen can be used.

The powdered solid animal nutrient is incorporated by blending the nutrient with the gel while agitating the gel sufficiently to form the suspension. Alternatively, as previously mentioned, the solid can also be incorporated into the animal feed supplement by blending with the aqueous sugar solution before the formation of the gel. This latter technique is preferred because of the greater efficiency in dispersing the solid in the liquid sugar solution before its gellation.

The following examples will illustrate the practice of the invention and serve to demonstrate some of the results which can be obtained.

EXAMPLES

In the following examples, feed supplement compositions are formulated to meet a typical nutrient specification. The specification is as follows:

TABLE 4

| Nutrient | Weight Percent |
| --- | --- |
| Protein from equivalent protein nitrogen | 36% |
| Ash | 38% |
| Calcium | 5% |
| Phosphorous | 1.25% |
| Sodium Chloride | 10% |

To reduce the cost of the liquid supplement, some of the cane molasses normally used in the supplement is substituted by a sodium lignin sulfonate solution and the calcium is supplied as inexpensive calcium carbonate. The resulting list of ingredients employed in preparation of the composition is as follows:

TABLE 5

| Ingredient | Weight Percent |
|---|---|
| Cane Molasses | 26.1% |
| Sodium Lignin Sulfonate | 15.0% |
| Ammonium Phosphate (10-34-0) | 9.6% |
| Aqua Ammonia | 1.2% |
| Sodium Chloride | 10.0% |
| Urea Solution (23.6% N) | 18.6% |
| Limestone Flour | 19.5% |

The protein in the feed supplement comprise the equivalent protein from the aqua ammonia and urea and ammonium phosphate as well as the natural protein in the cane molasses. The protein derivation in the formulation is as follows:

TABLE 6

| Protein Source | Weight Percent |
|---|---|
| Aqua Ammonia | 1.8% |
| Molasses | 1.5% |
| Ammonum Phosphate | 6.0% |
| Urea | 26.7% |

EXAMPLE 1

A series of feed supplements based on the aforementioned ingredients was prepared using the following procedure:

Solid urea prills are dissolved in hot water and the dispersing agent to be used is admixed with the urea solution which is agitated for five minutes. The sugar containing ingredient is added and all the water soluble ingredients are added and the mixture is stirred sufficiently to insure complete solution of the ingredients. Thereafter, all the aqua ammonium to be used in the formulation is added.

The amount of aqua ammonia is determined by experimentation to be that amount to achieve a final pH value of 7.0 in the final feed supplement. This amount can be simply determined by performing a series of experiments of slightly varied amounts of aqua ammonia within the expected range of required ammonia, checking the pH and selecting the one producing the desired pH value.

The ammonium phosphate solution is added after the aqua ammonia and a gel forms immediately upon the addition of the ammonium phosphate solution. This gel is stirred for a period of from 2 to about 20 minutes until it thins slightly. Thereafter, the insoluble powdered feed nutrient (calcium carbonate) is added and the mixture is stirred for 15 minutes to insure complete dispersion of the insoluble material. The viscosity and the pH of the feed supplement is then checked. The viscosity should be between 4,000 and 8,000 centipoises. If the viscosity is above the desired range, water is added to dilute the gel to the desired viscosity range. If the viscosity is below the desired range, it contains an excess quantity of water; reformulate with less $H_2O$ or more phosphorous or sulfate. Alternatively, further quantities of ammonium phosphate or ammonium sulfate can be added, preferably as dry solids to obtain a maximum increase in viscosity. In the event that the pH is below 7.0, aqua ammonia can be added to adjust the pH to the desired value. If the pH is above 7.0, phosphoric acid, sulfuric acid or other food compatible acids can be added to reduce the pH to the desired value.

The aforedescribed procedure was followed to prepare a series of six compositions which are set forth in the following table of ingredients with the proportions set forth in parts by weight. The pH values of the compositions before and after the addition of the limestone are measured and the final viscosity of the suspension of solid in the gel is determined for each of these compositions. The results of these inspections are also set forth in the following table:

TABLE 7

| Ingredient | 1 | 2 | 3 | 4 | 5 | 6 | 7 |
|---|---|---|---|---|---|---|---|
| 23% N Urea Solution | 256 | 256 | 256 | 256 | 256 | 256 | 256 |
| Starch, Gelatinized | — | — | 2.5 | 2.5 | — | — | — |
| Alginate (Kelco) | — | — | — | — | 1.0 | 1.0 | — |
| cane Molasses, 79 Brix | 238 | 190 | 190 | 165 | 190 | 165 | 438 |
| Sodium Lignin Sulfonate | 200 | 200 | 200 | 200 | 200 | 200 | — |
| NaCl | 100 | 100 | 100 | 100 | 100 | 100 | 100 |
| Water | — | 50 | 50 | 50 | 50 | 50 | — |
| Aqua Ammonia | 15 | 15 | 15 | 15 | 15 | 22 | 15 |
| 9-30-0 | 70 | 70 | 70 | 70 | 70 | 70 | 70 |
| Limestone (CaCO₃) | 115 | 115 | 115 | — | 115 | — | 115 |
| pH before Limestone Addition | 7.0 | 7.0 | 7.0 | 7.0 | 7.0 | 7.0 | 7.0 |
| pH after Limestone Addition | 7.1 | 7.0 | 7.0 | 7.0 | 7.0 | 7.0 | 6.5 |
| Final Viscosity | 13,000 | 3,000 | 6,000 | 7,500 | 8,000 | 15,000 | 13,000 |

Each of the samples is divided into three equal weight parts and temperature stability tests are determined by storage of the aliquot portions of the samples at 40°, 70° and 100° F. The samples are inspected daily to determine if phase separation occured. The results of this phase separation are set forth as follows:

1—Separated at 100° F. after three days.
2—Separated at 100° and 70° F. after three days.
3—Separated (very slightly) after 3 days at 100° F.
4—Separated (very slightly after 3 days at 100° F.
5—All samples OK after 6 days.
6—All gelled within 1 day.
7—The 100° F. sample gelled after 6 days.

The preceding examples demonstrate that the high temperature stability of the gelled suspensions is achieved by the incorporation of the minor quantities of a pre-gellatinized starch or an alginite. These dispersing agents are not needed, however, for storage at ambient temperatures.

The results also indicate that a viscosity of 15,000 centipoises is an excessively high viscosity (sample 6).

EXAMPLE 2

The effect of water on the viscosity of the product is determined in a series of experiments. In these experiments the quantity of the cane molasses is progressively decreased and the quantity of water is progressively increased in equal incremental amounts. Four samples are prepared having the composition set forth in the following table and exhibiting the viscosities and pH values, also set forth in the following table:

TABLE 8

| Ingredient | 1 | 2 | 3 | 4 |
|---|---|---|---|---|
| 23% Urea Solution | 256 | 256 | 256 | 256 |
| Starch, Gelatinized | 2.5 | 2.5 | 2.5 | 2.5 |
| Cane Molasses | 190 | 160 | 130 | 100 |
| Sodium Lignin Sulfonate | 200 | 200 | 200 | 200 |
| Water | 50 | 80 | 110 | 140 |
| Aqueous Ammonia | 15 | 15 | 15 | 15 |
| 9-30-0 | 70 | 70 | 70 | 70 |
| Limestone Flour | 114 | 114 | 114 | 114 |
| Total Weight | 997 | 997 | 997 | 997 |
| Final Viscosity | 9,500 | 10,000 | 4,000 | 2,500 |
| Final pH | 6.8 | 6.7 | 7.0 | 7.6 |
| Viscosity at 3 Days | | | | |
| (a) at rest | 16,000 | 16,000 | 6,000 | 6,000 |
| (b) mixed | 12,000 | 13,000 | 4,000 | 3,000 |
| Viscosity at 6 Days | | | | |
| (a) at rest | 13,000 | 23,000 | 7,000 | 6,000 |
| (b) mixed | 9,000 | 10,000 | 4,000 | 2,000 |

The samples 2, 3, and 4, all show a progressive decrease in the viscosity. Sample 4 has a viscosity which is probably too low for satisfactory performance in maintaining the suspension and samples 1 and 2 have viscosities which are near the maximum value suitable for use in the invention.

EXAMPLE 3

An additional experiment was performed to determine the effect of using a very minimal quantity of water in the formulation. Two samples were prepared according to the ingredients set forth in the following table:

TABLE 9

| Ingredient | 1 | 2 |
|---|---|---|
| (1) Cane Molasses | 710 | 760 |
| (2) Salt | 50 | 50 |
| (3) Urea (46%) | 60 | 60 |
| (4) Water | 60 | 10 |
| (5) 10-34-0 | 20 | 20 |
| (6) Aqua Ammonia | 10 | 14 |
| (7) Limestone Four | 100 | 100 |
| pH | 7.0 | 7.2 |
| Viscosity | 3,000 | 4,000 |

Aliquot portions of the samples set forth in the preceding table were stored at a series of temperatures from −12 to 100° F. The stability of the samples was checked after one day and the following table sets forth the results of the inspection:

TABLE 10

| 100° F. Sample | 8,000 | Too Thick |
|---|---|---|
| 70° F. Sample | 9,000 | Too Thick |
| 35° F. Sample | 16,000 | 30,000 |
| 4° F. Sample | 27,000 | 90,000 |
| −12° F. Sample | Too Thick | Too Thick |

EXAMPLE 4

A solid animal feed drug, Rumensin, was suspended in a gel formulation using a mixture of cane molasses and sodium lignin sulfonate as the sugar solution. The formulations set forth in the following table in weight parts were found to successfully suspend the animal drug Rumensin:

TABLE 11

| Ingredient | 1 |
|---|---|
| (1) Water | 6.6 |
| (2) Urea | 5.62 |
| (3) Starch | 0.125 |
| (4) Cane Molasses | 20.4 |
| (5) Sodium Lignin Sulfonate | 7.5 |
| (6) Trace Minerals | 0.1 |
| (7) Salt | 5.0 |
| (8) Rumensin 60 | 0.335 |
| (9) 10-34-0 | 3.5 |
| (10) Aqueous Ammonia | 0.8 |
| | 50.0 |

The Rumensin was added to the sugar solution before gelling. This procedure was practiced by forming a premix of the water, urea, and starch that was added to the mixture of molasses and lignin sugar solution. The Rumensin was dry-mixed with the sodium chloride and trace minerals and the resulting solid mixture was then added to the molasses and lignin sulfanate solution, together with the water, urea and starch pre-mix. The resulting mixture was stirred for five minutes and then the ammonia phosphate solution was added, forming the gel. The resulting gelatinous suspension of the Rumensin was stirred for five minutes and the pH of the mixture was adjusted from 5.8 to 6.8 by the addition of aqua ammonia. The mixture was agitated for 15 minutes after the aqua ammonia addition.

A stability inspection was made on these Rumensin-containing suspensions. Sixteen samples of 500 ml per sample of each preparation were placed in 500 ml graduate cylinders. Eight samples were stored at 37° C. and 8 samples were stored at 25° C. The material was sampled initially and after 4, 8, and 12 weeks. At the fourth week, the graduated cylinders were sampled at the top and the bottom to obtain top, bottom and mixed samples. At eight weeks, a mixed sample was obtained and at twelve weeks, top, bottom, and mixed samples were obtained. The sampling was performed by inserting a laboratory pipet into the cylinder at the desired elevation.

The samples were tested for monensin activity and the data on the observed activity are set forth in the following table:

TABLE 12

| Time | Samples at 25° | | | Samples at 37° | | |
|---|---|---|---|---|---|---|
| | Mixed | Top | Bottom | Mixed | Top | Bottom |
| Initial | 890 | — | — | 890 | — | — |
| 4 weeks | 850 | 875 | 825 | 800 | 800 | 800 |
| 8 weeks | 925 | — | — | 900 | — | — |
| 12 weeks | 925 | 950 | 950 | 850 | 750 | 1,025 |

The samples were to be stable throughout the entire period of testing in that the variation in Rumensin activity between the top and bottom samples did not vary more than 20% from the activity of the mixed samples, thereby meeting the FDA requirements for storage stability on drug containing feed compositions.

EXAMPLE 5

A sugar solution is gelled with ammonium sulfate and the resulting gell is employed for suspension of limestone flour. The formulation used is set forth in the following table:

TABLE 13

| Ingredient | Weight in Parts |
| --- | --- |
| (1) Water | 4,160 |
| (2) Urea | 2,600 |
| (3) Starch | 125 |
| (4) Cane Molasses | 21,275 |
| (5) Sodium Lignin Sulfonate | 10,000 |
| (6) Salt | 2,500 |
| (7) 21-0-0 (Ammonium Sulfate) | 4,000 |
| (8) Aqueous Ammonia | 400 |
| (9) Limestone Flour | 5,000 |

This sample is prepared in accordance with the procedure set forth in Example 1.

The gel suspension is inspected and found to have a static viscosity of 14,000 centipoises at 70° and 42,000 centipoises at 100°. The product is observed to be stable for prolonged storage.

EXAMPLE 6

A fat-containing gel suspension of Rumensin is prepared using the following ingredients:

TABLE 14

| Ingredient | Weight Percent |
| --- | --- |
| (1) Urea - (50% solution) | 16.36 |
| (2) Water | 1.07 |
| (3) Starch | 0.25 |
| (4) Trace Minerals | 0.20 |
| (5) Cane Molasses | 47.00 |
| (6) Sodium Lignin Sulfonate | 15.00 |
| (7) Salt (NaCl) | 1.9 |
| (8) MgSO$_4$ | 0.7 |
| (9) 10-34-0 | 6.9 |
| (10) Fat (Beef) | 10.0 |
| (11) Rumensin | 0.67 |

The urea, water and starch were mixed to form a urea premix and the Rumensin and fat were mixed to form a fat premix. The molasses and lignin sulfonate were introduced into a mixer and blended with the urea premix while stirring for five minutes. The trace minerals, salt and magnesium were added and the mixture was stirred for 10 minutes. The ammonium phosphate was then added and the mixture stirred for 10 minutes, forming the gel. The fat premix was added and the gel was stirred for 30 minutes. After standing for 1 hour, the gel was again stirred for 5 minutes.

The gel was stored and sampled similarly to the procedure of Example 4. The stability results are reported in the following table:

TABLE 15

| | Samples at 25° C. | | | Samples at 37° C. | | |
| --- | --- | --- | --- | --- | --- | --- |
| Time | Mixed | Top | Bottom | Mixed | Top | Bottom |
| Initial | 900 | — | — | 900 | — | — |
| 4 Weeks | 800 | 790 | 780 | 630 | 860 | 490 |
| 8 Weeks | 910 | — | — | 840 | — | — |
| 12 Weeks | 880 | 960 | 930 | 860 | 880 | 650 |

The results evidence that the drug was in a stable suspension throughout the test.

The invention has been described with reference to the presently preferred mode of practice. It is not intended that the invention be unduly limited by this disclosure of the presently preferred mode. Instead, it is intended that the invention be defined by the reagents, and steps, and their obvious equivalents, set forth in the following claims:

What is claimed is:

1. a method for the preparation of a thixotropic animal feed suspension supplement which consists essentially of:
   (1) incorporating, as the sole gelation agent, in an aqueous sugar solution containing at least 12 weight percent sugar, ammonium orthophospate or sulfate in sufficient quantity to form a gel;
   (2) controlling the pH value of the gel to a value from about 6.5 to about 7.5;
   (3) adding to said gel water-insoluble, powdered-solid animal feed nutrients comprising from 2 to about 20 weight percent of at least one member selected from the class consisting of calcium carbonate, calcium sulfate, calcium phosphate, and mixtures thereof, having a size passing about a 100 mesh, and retained on about a 325 mesh standard screen, and
   (4) adjusting the water content of the mixture to provide a viscosity thereto from 4,000 to about 10,000 cps.

2. The method of claim 1 wherein said solid is calcium carbonate.

3. The method of claim 2 including the step of adding urea in an amount from 5 to 15 weight percent to said supplement.

4. The method of claim 1 including the step of adding urea in an amount from 5 to 15 weight percent to said supplement.

5. The method of claim 1 wherein said sugar solution is molasses.

6. The method of claim 2 wherein said sugar solution is molasses.

7. The method of claim 4 wherein said sugar solution is molasses.

8. The method of claim 1 wherein said sugar solution is a lignin sulfonate.

9. The method of claim 1 including the step of adding from 1 to about 12 weight percent sodium chloride to said supplement.

10. The method of claim 1 including the step of adding to said supplement from 0.02 to about 0.15 weight percent of monesin, sufficient to provide an increase in animal feed efficiency.

11. The method of claim 1 including the step of adding to said supplement from 2 to about 20 weight percent of a water-insoluble, powder natural protein source.

* * * * *